United States Patent Office 3,164,571
POLYUREAS FROM N-PHENYL, PHENYLENE BIS-CARBAMYL HALIDE AND A DIAMINE
Robert J. Cotter, New Brunswick, N.J., assignor to Union Carbide Corporation, a corporation of New York
No Drawing. Filed Dec. 31, 1959, Ser. No. 863,092
5 Claims. (Cl. 260—77.5)

This invention relates to linear polyureas. More particularly, this invention relates to thermoplastic, linear polyureas prepared by polymerizing a bis-carbamyl halide with an organic diamine.

The thermoplastic polyureas of the present invention are prepared by polymerizing a bis-carbamyl halide having the general formula:

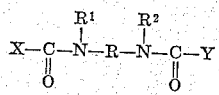

wherein X and Y are halogen atoms, i.e., chlorine, bromine, fluorine or iodine, $R^1$ and $R^2$ are monovalent hydrocarbon radicals, and R is a divalent hydrocarbon radical, with an organic diamine having the general formula:

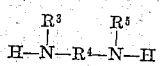

wherein $R^3$ is a monovalent hydrocarbon radical or a hydrogen atom, $R^5$ is a monovalent hydrocarbon radical or a hydrogen atom and $R^4$ is a divalent hydrocarbon radical for a period of time sufficient to produce a thermoplastic polyurea.

The polymerization reaction which results in the preparation of linear polyureas in accordance with the present invention can be illustrated by the following equations wherein the reactants are represented by general formula and also wherein the repeating unit of the polyurea is also represented by general formula:

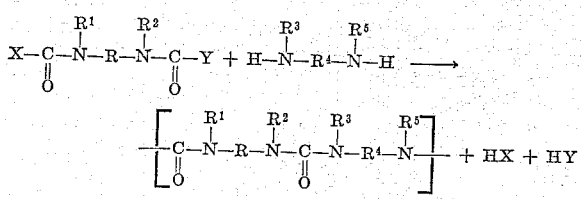

wherein X, Y, R, $R^1$, $R^2$, $R^3$, $R^4$, and $R^5$ are as previously defined.

The thermoplastic linear polyureas of the present invention are characterized by excellent heat stability at relatively high temperatures, by excellent clarity on being formed into thin film material, and also by relatively low second order phase transition temperatures. The linear polyureas, by reason of their relatively low second order phase transition temperatures, are particularly desirable for use in the preparation of film material of improved physical and chemical properties by means of the tubular expansion method wherein the polyurea is extruded into the shape of a seamless tubing at a temperature between the first and second order phase transition temperatures and biaxially stretched to effect an orientation of its molecules (cf. U.S. Patent 2,461,975 to E. D. Fuller, issued February 15, 1949). The polyureas of the present invention can be biaxially stretched at temperatures which can be easily attained without use of special equipment.

The term "monovalent hydrocarbon radical," as used herein with respect to the bis-carbamyl halides and also to the primary and secondary diamines is intended to encompass substituted hydrocarbon radicals as well as unsubstituted hydrocarbon radicals.

Exemplary of such radicals are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; alkenyl and cycloalkenyl radicals, such as allyl, cyclopentenyl, and the like; alkoxy and aryloxy substituted alkyl and cycloalkyl radicals, such as methoxymethyl, ethoxyethyl, 3-ethoxy-n-propyl. 4-ethoxy-n-butyl, 3-ethoxy-2-ethyl-n-hexyl, 2-methoxycylohexyl, phenoxy-methyl, 2-phenoxyethyl, 3-phenoxy-n-propyl, 2-phenoxy cyclohexyl, and the like; aralkyl radicals, such as benzyl, 2-phenyl-ethyl, 3-phenyl-n-propyl, 1-phenyl-n-butyl, 1-phenyl-n-dodecyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl, p-ethoxyphenyl, p-phenoxyphenyl, and the like; alkaryl radicals, such as o-methylphenyl, p-ethylphenyl, p-n-propylphenyl, o-n-propylphenyl, o-n-butylphenyl, p-n-dodecylphenyl, p-(2-ethyl-n-hexyl) phenyl, and the like; nitro substituted aryl radicals, such as p-nitrophenyl, 2-nitronaphthyl, and the like.

The term "divalent hydrocarbon radical" as used herein both with respect to the bis-carbamyl halides and to the organic primary and secondary diamines is intended to encompass unsubstituted as well as substituted divalent hydrocarbon radicals. Illustrative of suitable radicals are alkylene radicals, such as ethylene, trimethylene, tetramethylene, pentamethylene, hexamethylene, 2-ethyl-hexamethylene, octamethylene, nonamethylene, decamethylene, and the like; the cycloaliphatic radicals, such as 1,4-cyclohexane, 1,3-cyclohexane, 1,2-cyclohexane, and the like, alkoxy and aryloxy substituted alkylene and cycloaliphatic radicals, such as methoxy methylene, ethoxy methylene, ethoxy ethylene, 2-ethoxy trimethylene, 3-ethoxy pentamethylene, 1,4 - (2 - methoxy)cyclohexane, phenoxy-ethylene, 2-phenoxy-trimethylene, 1,3-(2-phenoxy)cyclohexane, and the like; aralkylene radicals, such as phenyl - ethylene, 2 - phenyl - trimethylene, 1 - phenylpentamethylene, 2-phenyl-decamethylene, and the like; aromatic radicals, such as phenylene, naphthylene, and the like; halogenated aromatic radicals, such as 1,4-(2-chloro)phenylene, 1,4 - (2 - bromo)phenylene, 1,4 - (2-fluoro)phenylene, and the like; alkoxy and aryloxy substituted aromatic radicals, such as 1,4-(2-methoxy)phenylene, 1,4-(2-ethoxy)phenylene, 1,4-(2-n-propoxy)phenylene, 1,4-(2-phenoxy)phenylene, and the like; alkyl substituted aromatic radicals, such as 1,4-(2-methyl)phenylene, 1,4-(2-ethyl)phenylene, 1,4-(2-n-propyl)phenylene, 1,4-(2-n-dodecyl)phenylene, and the like; unsaturated radicals such as 2-butene-1,4-; 2-pentene-1,5-; 3-methylhex-3-ene-1,6-; 2,4-dimethylbut-2-ene-1,4-; 4-n-butylhept-4-ene-1,7- and the like.

Representative of bis-carbamyl halides having the general formula previously given are the following:

1,2-bis-[(N-benzyl-N-chloroformyl)-amino]-ethane,
1,2-bis-[(N-methyl-N-chloroformyl)-amino]-ethane,
1,3-bis-[(N-methyl-N-chloroformyl)-amino]-propane,
1,6-bis-[(N-methyl-N-chloroformyl)-amino]-hexane,
1-[(N-phenyl-N-bromoformyl)-amino]-6-[(N-ethyl-N-chloroformyl)-amino]-hexane,
1,4-bis-[(N-ethyl-N-bromoformyl)-amino]-butane,
4,4'-bis-[(N-2-propyl-N-chloroformyl)amino]-diphenylmethane,
1,4-bis-[(N-phenyl-N-chloroformyl)-amino]-benzene,
1,4-bis-[(N-methyl-N-chloroformyl)-amino]-benzene,
1,4-(N-methyl-N'-ethyl)-bis-[(N,N'-chloroformyl)-amino]-benzene,
1-[(N-methyl-N-chloroformyl)-amino]-4-[(N-ethyl-N-chloroformyl)-amino]-benzene, and other like compounds free of interfering groups such as carboxylic acid groups, hydroxyl groups, primary and secondary amino groups and other such groups which are capable of reacting with the carbonyl halide groups of the bis-carbamyl halides.

Particularly desirable bis-carbamyl halides are those wherein R, $R^1$ and $R^2$ each contains a maximum of 20 carbon atoms and each is free of interfering groups.

Illustrative of suitable organic diamines having the general formula:

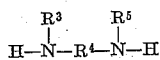

as previously defined are 1,2-diaminoethane,
1,3-diaminopropane,
1,4-diaminobutane,
1,5-diaminopentane,
1,6-diaminohexane,
1,8-diaminooctane,
1,9-diaminononane,
1,10-diaminodecane,
1,4-diaminocyclohexane,
1,4-phenylenediamine,
1,3-phenylenediamine,
1,2-phenylenediamine,
4,4′-diaminodiphenylmethane,
4,4′-diaminodiphenyl,
3,3′-diamino-4,4′-dimethyldiphenyl,
3,3′-diamino-4,4′-dimethoxydiphenyl,
N,N′-dimethylhexamethylenediamine,
N,N′-dimethyl-(2-phenoxy)-trimethylenediamine,
N,N′-dimethyldecamethylene diamine,
N,N′-dimethyl-2-phenyldecamethylene diamine,
N,N′-dimethyl-3,3′-diaminodiphenyl,
N-methyl-N′-ethyl hexamethylene diamine,
N-ethyl-N′-n-propyl-1,4-phenylene diamine,
N-phenyl-N′-(3-chloropropyl)-1,4-phenylene diamine,
N-ethyl-N′-(2-phenyl-n-decyl)-butane-1,4-diamine, and other like compounds free of interfering groups, i.e., those which will react with the carbonyl halide groups of the bis-carbamyl halides. Particularly desirable organic diamines are those wherein $R^3$ and $R^5$ are hydrogen or monovalent hydrocarbon radicals containing a maximum of 20 carbon atoms and $R^4$ contains a maximum of 20 carbon atoms. Also, mixtures of two different diamines having the same reactivity can be used.

Various amounts of the reactants can be used in the polymerization reaction to produce the linear polyureas of the present invention. Generally, at least 90 percent of stoichiometric to as much as 100 percent in excess of stoichiometric and higher, if so desired, of the organic diamine is used. It is preferred, however, to use a stoichiometric amount. For purposes of stoichiometric calculations involving the organic diamine and the bis-carbamyl halides, one amine group

is considered to react with one carbonyl halide group:

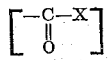

When using less than about 100 percent in excess of stoichiometric of the organic diamine, it is desirable to have present in the polymerization reaction mixture a base which is capable of reacting with the free hydrogen halide present in the reaction mixture to form the corresponding salt. By the term "free hydrogen halide" is meant the hydrogen halide which is formed in the reaction mixture and which has not been neutralized by the organic diamine. The presence of a base is desirable when using the organic diamines in amounts less than 100 percent in excess of stoichiometric in order to insure that the free hydrogen halide present in the reaction mixture will not effectively attack the linear polyurea which is being produced, materially affecting the yield and quality of the polyurea. Suitable bases which will "accept" hydrogen halide include, among others, the water soluble inorganic bases such as the alkali metal hydroxides, illustrative of which are sodium hydroxide, lithium hydroxide, potassium hydroxide, and the like; the alkali metal carbonates, such as sodium carbonate, lithium carbonate, potassium carbonate, and the like. Also suitable are the organic bases, such as the organic tertiary amines, particularly those having the general formula:

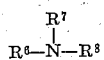

wherein $R^6$, $R^7$, and $R^8$ are monovalent hydrocarbon radicals, free of olefinic and acetylenic unsaturation, such as methyl, ethyl, n-propyl, isopropyl, n-butyl, n-amyl, n-hexyl, 2-ethyl-n-hexyl, n-heptyl, n-octyl, n-nonyl, n-dodecyl, benzyl, 2-phenylethyl, 3-phenyl-n-propyl, 4-phenyl-n-butyl, 5-phenyl-n-amyl, 2-phenyl-n-hexyl, 3-phenyl-n-heptyl, phenyl, o-methylphenyl, p-ethylphenyl, p-amylphenyl, o-n-butylphenyl, and the like. Specific compounds include, among others, trimethylamine, triethylamine, tri-n-propylamine, tri-n-butylamine, tri-n-dodecylamine, tri-n-decosylamine, tri-(2-phenylethyl) amine, tri-benzylamine, dimethyl-n-propylamine, diethyl-n-propylamine, methylethyl-n-propylamine, N,N-dimethylaniline, and the like. Particularly effective organic tertiary amines for purposes of this invention are those wherein $R^6$, $R^7$, and $R^8$ are either alkyl or aralkyl radicals, each having a maximum of 12 carbon atoms.

The actual amount of base used will depend upon the amount of the organic diamine present in the reaction mixture. Sufficient base is used to effect substantially complete neutralization of the free hydrogen halide present in the mixture. When less than 100 percent in excess of stoichiometric of the organic diamine is used, the base is used in stoichiometric amounts based on the amount of free hydrogen halide in the reaction mixture, so that the free hydrogen halide is neutralized forming the corresponding salt.

In conducting the polymerization reaction, it is also desirable to have present therein sufficient water to effectively remove from the organic reactants, salt formed on neutralization of the hydrogen halide. The water, in removing the salt from the organic reactants, facilitates recovery of the linear polyurea which is formed. The actual amount of water used can vary over a wide range, i.e., about 5 to 25 times by weight based on the combined weight of the organic diamine and the "hydrogen halide accepting" base.

It is also preferred to conduct the polymerization reaction in the presence of an organic diluent which is a solvent for the bis-carbamyl halide and the organic diamine and is non-reactive with respect to the starting materials and the linear polyurea which is formed. The use of an organic diluent also provides a medium in which the starting materials are brought into intimate contact and also facilitates removal of the linear polyurea from the reaction medium.

The actual organic diluent used will depend upon the reactants and the temperature at which the polymerization reaction is to be conducted. The organic diluent should have a boiling point equal to or above the polymerization reaction temperature. It is customary to use the organic diluent in amounts of at least about 200% by weight based on the weight of the starting materials. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to about 500% by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxybenzene and the like; aliphatic hydrocarbons, such as n-hexane, n-heptane, and the like; halogenated aliphatic hydrocarbons, such as dichloromethane and the like; ethers, such as diethyl ether, diethyl ether of ethylene glycol, diethyl ether of 1,3-propylene glycol, dioxane, and the like; also suitable are petroleum ether, tetrahydrofuran, and the like. Mixtures of these diluents can also be used.

The polymerization reaction is conducted, generally, under atmospheric pressure, although if desired, it can be conducted under subatmospheric or superatmospheric pressure.

The temperature at which the polymerization reaction can be conducted can vary over a wide range. Temperatures in the range of about 0° C. to about 150° C. are satisfactory. At temperatures lower than about 0° C., the polymerization reaction proceeds too slow to be practical. A temperature in the range of about 25° C. to about 75° C. is most preferred.

The process of polymerizing a bis-carbamyl halide with an organic diamine in accordance with the present invention is conducted by simply admixing the starting materials and stirring the mixture at the desired temperature for a period of time sufficient to produce a solid thermoplastic polyurea. Usually the polymerization reaction proceeds substantially to completion in about one hour. Generally the bis-carbamyl halide is dissolved in an organic diluent and added to an aqueous mixture of an organic diamine and a "hydrogen halide accepting" base.

Recovery of the linear polyurea from the reaction mixture can be accomplished by any one of a number of convenient methods. For example, in those instances wherein the polyurea is soluble in the organic diluent used in the polymerization reaction, the reaction mixture can be poured into a solvent in which the linear polyurea is insoluble and the organic diluent is soluble with the result that the polyurea will precipitate out. The linear polyurea can then be recovered by a simple filtration operation and then, if desired, washed with various liquids such as water and the like.

The bis-carbamyl halides which can be polymerized in accordance with the present invention can be obtained by reacting a carbonyl halide such as carbonyl chloride, carbonyl fluoride, carbonyl bromide, carbonyl iodide, and the like with an organic secondary diamine in the presence of an inorganic base, such as sodium hydroxide, sodium carbonate, and the like or an organic base, such as triethylamine and the like. Preparation of the bis-carbamyl halides is further described in Example 1 of this specification and also in United States Patent 2,398,283 to William R. Boon, issued April 9, 1946, which is incorporated herein by reference.

In the examples which follow, which are illustrative and not intended to limit the scope of the invention in any manner, the procedure used to determine the reduced viscosity values was as follows: a 0.2 gram sample of the linear polyurea was weighed into a volumetric flask containing 100 ml. of a solvent. The contents of the flask were stirred until solution of the polyurea was complete. The solution was then filtered through a sintered glass funnel and the viscosity of a 3 ml. sample determined on a Cannon viscometer at about 25° C. Reduced viscosity was determined by the use of equation:

$$R.V. = \frac{t_s - t_0}{c t_0}$$

wherein:

$t_0$ is the efflux time for the solvent
$t_s$ is the efflux time for the polyurea solution
$c$ is the concentration of the solution in terms of grams of polyurea per 100 ml. of solution The second order phase transition temperatures noted refer to inflection temperatures found by plotting the resilience (recovery from 1% elongation of a film ranging in thickness from 3–15 mils) against the temperature. A detailed explanation of determining resilience and inflection temperatures is to be found in an article by Alexander Brown in "Textile Research Journal," volume 25, 1955, page 891, which article is incorporated herein by reference.

EXAMPLE 1

*Polymerization of 1,4-Bis-[(N-Phenyl-N-Chloroformyl)-Amino]-Benzene with Hexamethylene Diamine*

Into a Pyrex glass flask equipped with a stirrer, dropping funnel, thermometer and containing 400 ml. of dichloromethane, there was charged 29.70 grams (0.3 mole) of phosgene. To this solution there was then added dropwise a solution of 26.04 grams (0.1 mole) of N,N'-diphenyl-p-phenylene diamine and 20.24 grams (0.2 mole) of triethylamine in 600 ml. of dichloromethane while the contents of the flask were maintained at 0° C. After the addition was completed, the reaction mixture was allowed to warm to room temperature (about 25° C.). The mixture was then transferred to a separatory funnel and washed twice with 200 ml. portions of ice water. The organic layer was removed from each aqueous layer and dried over calcium chloride. The organic layer was then heated for two hours at a temperature of about 45° C. under atmospheric pressure, thereby distilling off the dichloromethane. The solid remaining was recrystallized from toluene yielding 33.4 grams of 1,4-bis-[(N-phenyl-N-chloroformyl)-amino]-benzene.

*Analysis.*—Calculated for $C_{20}H_{14}N_2O_2Cl_2$: C, 62.3%; H, 3.66%; Cl, 18.45%; N, 7.27%. Found: C, 61.52%; H, 3.68%; Cl, 18.06%; N, 7.49%. Melting point 210° C.–216° C.

Into a solution of 2.23 grams (0.021 mole) of anhydrous sodium carbonate and 1.16 grams (0.01 mole) of hexamethylene diamine in 15 ml. of water contained in a Pyrex glass flask equipped with a thermometer, stirrer, dropping funnel, and reflux condenser, there was added dropwise a solution of 3.85 grams (0.01 mole) of 1,4-bis-[(N-phenyl-N-chloroformyl)-amino]-benzene in 40 ml. of tetrahydrofuran. The mixture was heated under reflux for two hours while being continuously stirred. At the end of two hours, the reaction mixture was poured into a Waring Blendor which contained 300 ml. of water, the temperature of the water being at about 25° C. with the result that the polyurea which had formed in the reaction mixture precipitated. The polyurea was washed in the Waring Blendor two additional times with 300 ml. portions of water, removed from the blendor and dried by heating at a temperature of 100° C., a pressure of 5 mm. Hg. for 24 hours. 4.1 grams of a thermoplastic polyurea were obtained corresponding to a yield of 96% based on the theoretical yield.

The linear polyurea was white in color, fibrous in texture, and could be molded into various shaped articles on a steam press. The polyurea had a capillary melting point of 160° C.–170° C. and a reduced viscosity of 0.56 in dimethylformamide and a reduced viscosity of 0.28 in tetrahydrofuran.

EXAMPLE 2

*Polymerization of 1,4-Bis-[(N-Phenyl-N-Chloroformyl)-Amino]-Benzene With Decamethylene Diamine*

Into a Pyrex glass flask equipped with a stirrer, thermometer dropping funnel and reflux condenser and containing a solution of 2.23 grams (0.021 mole) of anhydrous sodium carbonate and 1.72 grams (0.01 mole) of decamethylene diamine in 15 ml. of water there was added 3.85 grams (0.01 mole) of 1,4-bis-[(N-phenyl-N-chloroformyl)-amino]-benzene in 40 ml. of tetrahydrofuran. The mixture was heated under reflux for two hours while being continuously stirred. At the end of two hours, the reaction mixture was poured into a Waring Blendor which contained 300 ml. of water, the water being at room temperature (about 25° C.) with the result that the polyurea which had formed in the reaction mixture precipitated. The polyurea was washed in the Waring Blendor two additional times with 300 ml. portions of water. The thermoplastic polyurea was then removed from the Waring Blendor and dried by heating at a temperature of 100° C. and under a pressure of 5 mm. Hg for 24 hours. 4.8 grams of the thermoplastic polyurea were recovered, which corresponded to a yield of 100%.

The thermoplastic polyurea was white in color, fibrous in texture and could be molded into various shaped articles on a steam press. The polyurea had a capillary melting point of 140° C.–150° C. and a reduced viscosity in dimethyl formamide of 0.60.

EXAMPLE 3

The polyureas of Examples 1 and 2 were compression molded at 160° C. into clear, transparent films having a thickness of 5 mils. Each film was then subjected to certain tests to determine its physical strength and properties. The particular tests to which the film material was subjected, as well as the results thereof, are noted in the table below.

| Polyurea | Tensile Strength, ASTM–D-882–56T | Tensile Modulus, ASTM–D-882–56T | Percent Elongation, ASTM–D-882–56T | Second Order Phase Transition Temperature, ° C. |
|---|---|---|---|---|
| Example 1 | 7,900 | 248,000 | 5 | 103 |
| Example 2 | 5,570 | 258,000 | 8 | 61 |

EXAMPLE 4

*Polymerization of 1,6-Bis-[(N-Methyl-N-Chloroformyl)-Amino]-Hexane With Hexamethylene Diamine*

Into a Pyrex glass flask equipped with a thermometer, stirrer, dropping funnel, and reflux condenser and containing a solution of 1.74 grams (0.015 mole) of hexamethylene diamine and 3.35 grams (0.0316 mole) of sodium carbonate in 15 ml. of water, there was added, dropwise, a solution of 4.04 grams (0.015 mole) of 1,6-bis-[N-methyl-N-chloroformyl) - amino] - hexane in 25 ml. of tetrahydrofuran. The resultant mixture was held under reflux for three hours with stirring. The contents of the Pyrex glass flask were then poured into a Waring Blendor containing 300 ml. of water, with the result that the polyurea which had formed in the mixture precipitated out. The white colored solid polyurea was washed two additional times in the Waring Blendor with 300 ml. portions of water, after which the polyurea was dried by heating at a temperature of 100° C. and under a pressure of 5 mm. Hg for 24 hours. 3.0 grams of a linear polyurea were obtained corresponding to a yield of 69.8%.

Properties of the polyurea:

Reduced viscosity in dimethylformamide _____ 0.52
Tensile strength (ASTM–D–882–56T) ____p.s.i__ 1800
Tensile modulus (ASTM–D–882–56T) ____ p.s.i.__ 3170
Percent elongation (ASTM–D–882–56T) _____ 670

Tensile strength, tensile modulus, and percent elongation were determined on film material 3 mils. thick which was prepared by a solution cast method.

EXAMPLE 5

*Polymerization of 1,6-Bis-[(N-Methyl-N-Chloroformyl)-Amino] - Hexane With N,N'-Dimethylhexamethylene Diamine*

Into a Pyrex glass flask equipped with a thermometer, stirrer, dropping funnel, and reflux condenser and containing a solution of 1.42 grams (0.01 mole) of N,N'-dimethylhexamethylene diamine and 2.23 grams (0.021 mole) of sodium carbonate in 10 ml. of water there was added dropwise a solution of 2.69 grams (0.01 mole) of 1,6-bis-[(N-methyl-N-chloroformyl)-amino]-hexane in 20 ml. of tetrahydrofuran. The resultant mixture was maintained under reflux with stirring for three hours. The contents of the Pyrex glass flask were then poured into a Waring Blendor which contained 300 ml. of water, with the result that the polyurea which had formed in the mixture precipitated out. The polyurea was washed two additional times with 300 ml. portions of water and dried by heating at a temperature of 100° C. under a pressure of 5 mm. Hg for 24 hours. The thermoplastic polyurea had a reduced viscosity of 0.34 in dimethylformamide.

EXAMPLE 6

*Polymerization of 1,4-Bis-[(N-Methyl-N-Choroformyl)-Amino]-Benzene With Hexamethylene Diamine*

Into a Pyrex glass flask equipped with a thermometer, stirrer, dropping funnel and reflux condenser and containing a solution of 1.16 grams (0.01 mole) of hexamethylene diamine and 2.23 grams (0.021 mole) of sodium carbonate in 15 ml. of water there was added dropwise a solution of 2.61 grams (0.01 mole) of 1,4-bis-[(N-methyl-N-chloroformyl-amino]-benzene in 40 ml. of tetrahydrofuran. The resultant mixture was stirred and held under reflux with stirring for 2½ hours. The contents of the Pyrex glass flask were then poured into a Waring Blendor which contained 300 ml. of water with the result that the polyurea which had formed precipitated out. The polyurea was washed two additional times with 300 ml. portions of water and dried by heating at 100° C. under a pressure of 5 mm. Hg for 24 hours. 3.1 grams of the thermoplastic polyurea were recoverd corresponding to a yield of 82.2%.

Properties of the polyurea:

Reduced viscosity in p-chlorophenol _____ 0.96
Tensile strength (ASTM–D–882–56T) __p.s.i__ 4630
Tensile modulus (ASTM–D–882–56T) __p.s.i__ 320,000
Percent elongation (ASTM–D–882–56T) _____ 46

EXAMPLE 7

*Polymerization of 1,6-Bis-[(N-Phenyl-N-Chloroformyl)-Amino]-Hexane With Hexamethylene Diamine*

Into a Pyrex glass flask equipped with a thermometer, stirrer, dropping funnel and reflux condenser and containing a solution of 1.16 grams (0.01 mole) of hexamethylene diamine and 2.23 grams (0.01 mole) of sodium carbonate in 15 ml. of water there was added dropwise a solution of 1,6-[(N-phenyl - N - chloroformyl)-amino]-hexane in 100 ml. of dioxane. The resultant mixture was stirred and heated under reflux for two hours. The contents of the Pyrex glass flask were then poured into a Waring Blendor containing 300 ml. of water with the result that the polyurea which had formed precipitated out. The polyurea was washed two additional times with 300 ml. portions of water and dried by heating at 100° C. under a pressure of 5 mm. Hg for 24 hours. The thermoplastic polyurea had a reduced viscosity of 0.04 in dimethylformamide.

The thermoplastic, linear polyureas of the present invention can be molded or otherwise formed in various shaped articles, for example film material which can be used as wrapping material and the like.

What is claimed is:

1. A thermoplastic, linear polyurea having a tensile strength in excess of about 5,570 p.s.i. consisting of a plurality of repeating units which have the general formula:

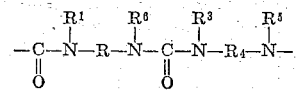

wherein $R^1$ and $R^2$ are phenyl radicals, R is a phenylene radical, $R^4$ is a divalent hydrocarbon radical and $R^3$ and $R^5$ are selected from the group consisting of hydrogen and monovalent hydrocarbon radicals.

2. A thermoplastic, linear polyurea as defined in claim 1 wherein $R^3$ and $R^5$ are hydrogen atoms.

3. A thermoplastic, linear polyurea as defined in claim 1 wherein $R^3$ and $R^5$ are monovalent hydrocarbon radicals.

4. A thermopalstic, linear polyurea as defined in claim 1 wherein $R^3$ and $R^5$ are hydrogen and $R^4$ is hexamethylene.

5. A thermoplastic, linear polyurea as defined in claim 1 wherein $R^3$ and $R^5$ are hydrogen and $R^4$ is decamethylene.

References Cited in the file of this patent

UNITED STATES PATENTS

| | | |
|---|---|---|
| 2,398,283 | Boon | Apr. 9, 1946 |
| 2,813,775 | Steuber | Nov. 19, 1957 |
| 2,816,879 | Wittbecker | Dec. 17, 1957 |
| 2,929,803 | Frazer | Mar. 22, 1960 |

FOREIGN PATENTS

| | | |
|---|---|---|
| 535,139 | Great Britain | Mar. 31, 1941 |

OTHER REFERENCES

Lyman et al.: Journal of Polymer Science, vol. 40, pages 407–418, November 1959.

UNITED STATES PATENT OFFICE
CERTIFICATE OF CORRECTION

Patent No. 3,164,571            January 5, 1965

Robert J. Cotter

It is hereby certified that error appears in the above numbered patent requiring correction and that the said Letters Patent should read as corrected below.

Column 8, lines 73 to 75, the formula should appear as shown below instead of as in the patent:

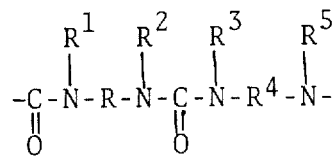

Signed and sealed this 27th day of July 1965.

(SEAL)
Attest:

ERNEST W. SWIDER
Attesting Officer

EDWARD J. BRENNER
Commissioner of Patents